United States Patent
Sellers et al.

(10) Patent No.: US 7,940,280 B2
(45) Date of Patent: May 10, 2011

(54) SYSTEM AND METHOD FOR COLOR FORMAT CONVERSION IN A GRAPHICS ENVIRONMENT

(75) Inventors: Graham Sellers, Toronto (CA); Benjamin Vinegar, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 776 days.

(21) Appl. No.: 11/951,536

(22) Filed: Dec. 6, 2007

(65) Prior Publication Data

US 2009/0147020 A1    Jun. 11, 2009

(51) Int. Cl.
G09G 5/00 (2006.01)
G09G 5/02 (2006.01)
G09G 5/36 (2006.01)
G03F 3/08 (2006.01)
G06K 9/00 (2006.01)

(52) U.S. Cl. ........ 345/589; 345/591; 345/600; 345/601; 345/549; 358/518; 358/523; 382/162; 382/167

(58) Field of Classification Search .................. 345/427, 345/428, 581, 589–591, 597, 600–601, 604–606, 345/592, 546, 549, 561; 358/515–518, 523, 358/470; 382/162–167, 182, 218, 247, 254; 708/232, 235, 653, 671

See application file for complete search history.

(56) References Cited

U.S. PATENT DOCUMENTS

| | | | |
|---|---|---|---|
| 5,815,616 A | 9/1998 | Bishop et al. | |
| 5,896,136 A | 4/1999 | Augustine et al. | |
| 6,522,327 B2 | 2/2003 | Deering | |
| 6,614,444 B1 | 9/2003 | Duluk, Jr. et al. | |
| 6,683,979 B1 | 1/2004 | Walker et al. | |
| 2003/0190042 A1 * | 10/2003 | Tagashira et al. | 380/45 |
| 2004/0130552 A1 | 7/2004 | Duluk, Jr. et al. | |
| 2009/0002207 A1 * | 1/2009 | Harada et al. | 341/51 |
| 2010/0165413 A1 * | 7/2010 | Kaburagi | 358/3.27 |

* cited by examiner

Primary Examiner — Wesner Sajous
(74) Attorney, Agent, or Firm — Mark P. Watson

(57) ABSTRACT

A method of converting an input color codeword from a first color format to a second color format comprises providing a reference format having reference bit positions and comparing the first bit positions associated with the first color format to the reference bit positions. Second bit positions associated with the second color format are compared to the reference bit positions. The relative bit position shifts based on the compared first bit positions and the compared second bit positions are determined. Format conversion bit masks are then generated based on the first and second color formats and the determined relative bit position shifts. The input color codeword is converted to the second color format based on the format conversion bit masks and the relative bit position shifts.

24 Claims, 10 Drawing Sheets

SYSTEM AND METHOD FOR COLOR FORMAT CONVERSION IN A GRAPHICS ENVIRONMENT

FIELD OF THE INVENTION

The present invention relates generally to graphics processing, and more particularly to a system and method of converting an input color codeword from a first color format to a different second color format.

BACKGROUND OF THE INVENTION

During display of computer graphics, color data stored in memory (e.g., RAM) is typically accessed and processed by a graphics device such as, for example, a graphics interface card, display adaptor, graphics accelerator card, or video card. The bit-format of the color data is a function of the selected color format (e.g., RGB565, RGBA444, etc.) and the color format that is selected is dependent on many different factors, such as graphics hardware use, evolution of additional standards, processing overhead, resolution capabilities, etc. As many different color formats exist, it is not surprising that in many environments conversion between color formats is necessary.

Typically, color data is represented as triplets of red (R), green (G) and blue (B) intensities that in combination generate a spectrum of colors. Each of the red, green, and blue color channels may include a number of designated data-bits associated with them, where the bit-values of the designated data-bits correspond to a respective intensity for each color channel. These data-bits are arranged according to the selected color format and are often stored such that they make up a machine word or codeword on a computer system. For example, the 16-bit RGB565 color format allocates 5-bits for the red channel, 6-bits for the green channel, and 5-bits for the blue channel. The 32-bit RGBA8888 color format allocates 8-bits for each of the red, green, blue and alpha channels, where alpha is typically used to convey additional information such as transparency.

In environments where color format conversion is required, graphics processing devices (e.g., graphics interface card) that support different color formats by converting between them are typically employed. Such color format conversions may, for example, be carried out by software implementations of computer graphics libraries (e.g., OpenGL, OpenGL ES, etc.) or hardware architectures within computer systems and embedded devices. As will be appreciated, as support for converting between different color formats increases, so does the amount of processing overhead in the form of additional software code (e.g., color format conversion functions), hardware (e.g., memory, processor speed), or combination thereof.

Different techniques for addressing graphics processing are known. For example, U.S. Pat. No. 5,815,166 to Baldwin discloses a graphics processing system with a message-passing architecture, in which a rasterizer can be bypassed by a particular type of message from a host. This permits rasterization to be slaved to host downloads and bitmasks, so that images and patterns can be applied to lines and polygons, rather than just rectangles.

U.S. Pat. No. 5,896,136 to Augustin et al. discloses a system and method for blending source pixel color values with destination pixel color values. A computer graphics system is disclosed including a resolution increasing circuit that increases the number of bits in a source alpha value to produce an increased resolution source alpha value. Blending hardware implements a routine according to a blending equation in order to blend the source pixel color values with the destination pixel color values using the increased resolution source alpha value. The resolution increasing circuit includes a squaring circuit that squares the source alpha value.

U.S. Pat. No. 6,522,327 to Deering discloses a decompressor unit having an input FIFO that receives compressed data bits. The FIFO output is provided to an input block state machine and an input block, whose outputs are coupled to a barrel shifter unit. The input block output also is input to Huffman tables that output to the state machine. The state machine output also is coupled to a data path controller whose output is coupled to a tag decoder, and to a normal processor receiving output from the barrel shifter unit. A position/color processor receives output from the barrel shifter unit. Outputs from the normal processor and the position/color processor are multiplexed to a format converter. For instructions in the data stream that generate output to the format converter, the decompression unit generates a tag that is sent to the tag decoder. The decompressed stream of triangle data may then be passed to a traditional rendering pipeline, where it can be processed with full floating point accuracy, and thereafter displayed or otherwise used.

U.S. Pat. No. 6,614,444 to Duluk, Jr. et al. discloses an apparatus and method for rendering 3D graphics images. The apparatus includes a port for receiving commands from a graphics application, an output for sending a rendered image to a display and a fragment-operations pipeline, coupled to the port and to the output. The pipeline includes a stage for performing a fragment operation on an image fragment on a per-pixel basis, as well as a stage for performing a fragment operation on the image fragment on a per-sample basis. The per-pixel basis fragment operation stage comprises one of a scissor-test stage, a stipple-test stage, an alpha-test stage, and a colorest stage. The per-sample basis fragment operation stage comprises one of a Z-test stage, a blending stage and a dithering stage. The apparatus programmatically selects whether to perform a stencil test on a per-pixel basis or a per-sample basis and performs the stencil test on the selected basis. The apparatus also programmatically selects pixel samples for per-sample operations, where the sample selections differ with different instances of the same per-sample operation. The apparatus also programmatically selects a set of subdivisions of a pixel as samples for use in the per-sample fragment operation, programmatically assigns different weights to at least two samples in the set and performs the per-sample basis fragment operation on the image fragment using the programmatically selected and differently weighted samples.

U.S. Pat. No. 6,683,979 to Walker et al. discloses a system, method and apparatus for compressing and decompressing image data. A color cell is compressed by defining at least four luminance levels of the color cell. A bitmask for the color cell is generated with the bitmask having a plurality of entries each corresponding to a respective one of the pixels. Each of the entries stores data identifying one of the luminance levels associated with a corresponding one of the pixels. A first average color of pixels associated with a first one of the luminance levels is calculated and a second average color of pixels associated with a second one of the luminance levels is also calculated. The bitmask in association with the first average color and the second average color are stored. In another embodiment, the color cell is compressed by determining a luminance value for each pixel of the color cell, selecting a maximum luminance value and a minimum luminance value for the color cell, subdividing the interval into at least two approximately equal subintervals, generating at least one bitmask that associates each pixel of the color cell with one subinterval, and determining a representative color value for each subinterval from the pixels of the color cell associated with the subinterval. Compression can be performed at a real-time rate. Compression of luminance, intensity and alpha textures is supported.

U.S. Patent Application Publication No. 2004/0130552 to Duluk, Jr. et al. discloses a deferred shading graphics pipeline processor and method. The processor and method may include one or more of deferred shading, a tiled frame buffer, and multiple stage hidden surface removal processing. In the deferred shading graphics pipeline, hidden surface removal is completed before pixel coloring is done. The pipeline processor comprises a command fetch and decode unit, a geometry unit, a mode extraction unit, a sort unit, a setup unit, a cull unit, a mode injection unit, a fragment unit, a texture unit, a Phong lighting unit, a pixel unit and a backend unit.

Although various techniques for graphics processing exist, improvements in format conversion are desired. It is therefore at least one object of the present invention to provide a novel system and method for color format conversion in a graphics environment.

SUMMARY OF THE INVENTION

Accordingly, in one aspect, there is provided a method of converting an input color codeword from a first color format to a second color format, where the method comprises:

providing a reference format having reference bit positions;

comparing first bit positions associated with the first color format to the reference bit positions;

comparing second bit positions associated with the second color format to the reference bit positions;

determining relative bit position shifts based on the compared first bit positions and the compared second bit positions;

generating format conversion bit masks based on the first and second color formats and the determined relative bit position shifts; and converting the input color codeword to the second color format based on the format conversion bit masks and the relative bit position shifts.

In one embodiment, the input codeword, the second color format and the reference format each comprise a plurality of channels. The comparing, determining, generating and converting is performed for each channel. For example, the input color codeword, second color format and reference format will each typically comprise red, green and blue color channels. One or more of the input color codeword, second color format and reference format may comprise one or more additional channels such as for example an alpha channel. The first, second and reference bit positions are the most significant bits of the channels In one embodiment, the generation of the format conversion bit masks includes providing a first plurality of bit-masks associated with the first color format, providing a second plurality of bit-masks associated with the second color format, bit-shifting the first plurality of bit-masks based on the determined relative bit position shifts, and performing a logic AND operation on the bit-shifted first plurality of bit-masks and the second plurality of bit-masks.

According to another aspect, there is provided a system for converting an input color codeword from a first color format to a second color format, where the system comprises:

a lookup table adapted to receive an identifier, the identifier identifies first bit-masks corresponding to the first color format, second bit-masks corresponding to the second color format, and bit-shift values associated with the first and the second color format;

a bit-mask processor unit operatively coupled to the lookup table, the bit-mask processor unit adapted to generate format conversion bit-masks based on the identified first and second bit-masks and the bit-shift values; and a codeword format conversion unit operatively coupled to the bit-mask processor unit and the lookup table, and adapted to convert the input color codeword to a different second color format based on the format conversion bit-masks and the bit-shift values.

In one embodiment, the codeword format conversion unit comprises a first plurality of shift registers each adapted to receive one of a plurality of color channel bit-masks associated with the generated format conversion bit-masks and a second plurality of shift registers adapted to receive a plurality of color channels associated with the input color codeword, whereby the plurality of color channels is bit-shifted according to the bit-shift values. The codeword format conversion unit also comprises a plurality of logic devices each operatively coupled to each of the first and second plurality of shift registers, where each of the plurality of logic devices is adapted to perform an AND logic operation on one of the bit-shifted color channels and a corresponding one of the plurality of color channel bit-masks. Further, a logic device is operatively coupled to the plurality of logic devices and is adapted to perform a logic OR operation on a result of each AND logic operation on the one of the bit-shifted color channels and the corresponding one of the plurality of color channel bit-masks.

According to yet another aspect, there is provided a system for converting an input color codeword from a first color format to a second color format, where the system comprises:

means for comparing first bit positions associated with the first color format to reference bit positions associated with a reference format;

means for comparing second bit positions associated with the second color format to the reference bit positions;

means for determining relative bit position shifts based on the compared first bit positions and the compared second bit positions;

means for generating format conversion bit masks based on the first and second color format and the determined relative bit position shifts; and means for converting the input color codeword to the second color format based on the format conversion bit masks and the relative bit position shifts.

According to still yet another aspect, there is provided a computer-readable medium embodying machine-readable code for converting an input color codeword from a first color format to a second color format, where the machine-readable code comprises:

machine-readable code for comparing first bit positions associated with the first color format to reference bit positions associated with a reference format;

machine-readable code for comparing second bit positions associated with the second color format to the reference bit positions;

machine-readable code for determining relative bit position shifts based on the compared first bit positions and the compared second bit positions;

machine-readable code for generating format conversion bit masks based on the first and second color format and the determined relative bit position shifts; and machine-readable code for converting the input color codeword to the second color format based on the format conversion bit masks and the relative bit position shifts.

BRIEF DESCRIPTION OF THE DRAWINGS

Embodiments will now be described more fully with reference to the accompanying drawings in which.

DETAILED DESCRIPTION OF THE EMBODIMENT

In the following description, systems and methods of color format conversion are provided. In one aspect, a method of converting an input color codeword from a first color format (i.e., source format) to a second color format (i.e., target format) in, for example, a graphics accelerator card is achieved by comparing both the bit positions associated with the first color format and the bit positions associated with the second color format to the bit positions of a reference format. Relative bit position shifts between the first and second color formats are then determined from this comparison. Format conversion bit masks are then generated based on the first and second color formats, and the determined relative bit position shifts. The input codeword is then converted from the first color format to the second color format based on the format conversion bit masks and the relative bit position shifts.

Figure 1:
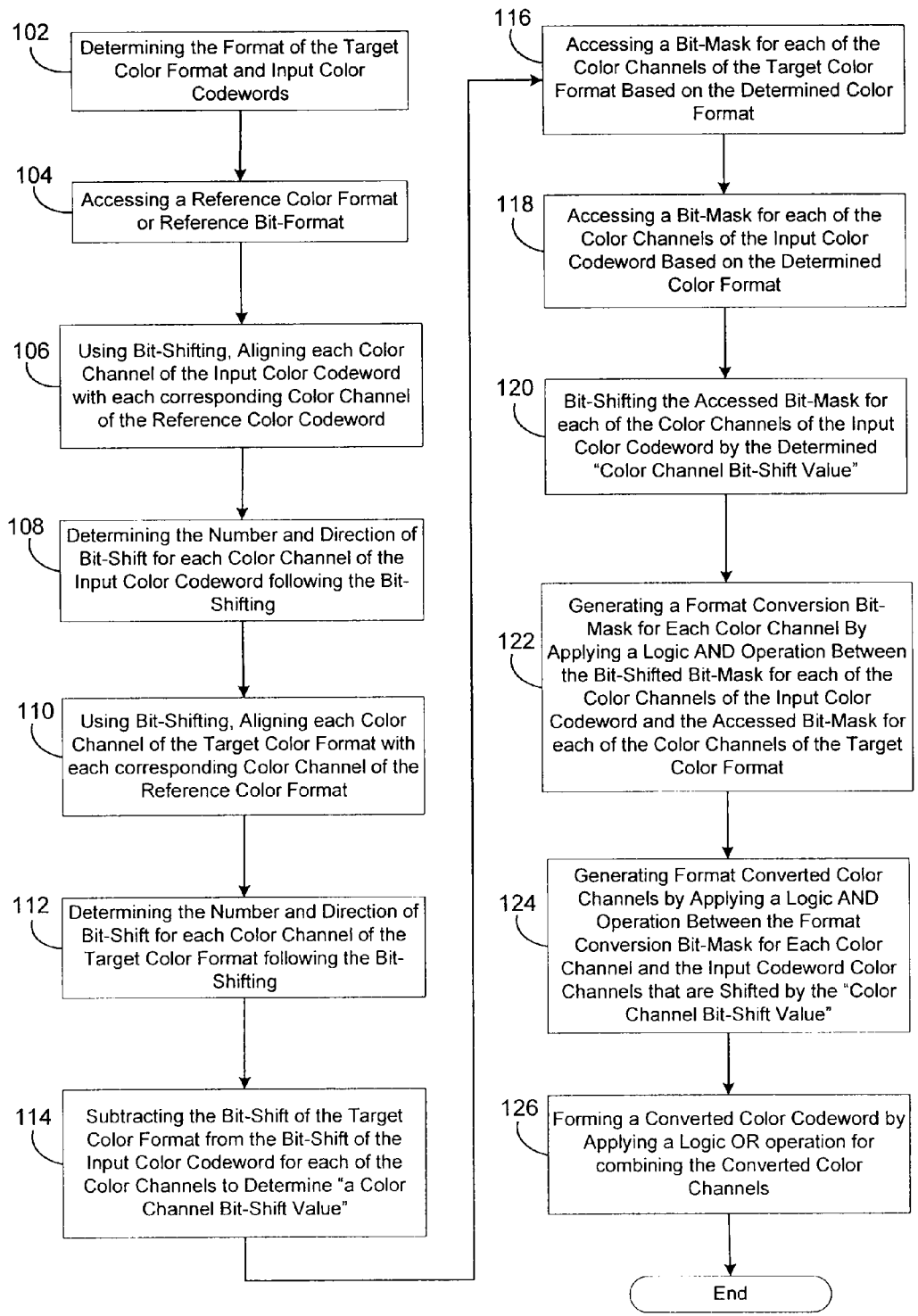
FIG. 1 is an operational flow diagram for color format conversion of an input codeword.

Turning now to FIG. 1, an operational flow diagram 100 for color format conversion of an input codeword from a source color format to a target color format is illustrated. The operational flow diagram 100 will be described with the aid of FIGS. 2A, 2B, 3A, and 3B. A bit-position indicator 220 (FIGS. 2A and 2B) is shown in order to identify the bit positions of the color formats.

Initially, during format conversion, the color format of the input codeword i.e. the source color format, and the color format to which the input codeword is to be converted i.e. the target color format, are determined (step 102). In this example, the source color format is the RGB565 color format and the target color format is the RGBA4444 target format. In the RGBA4444 color format 202, the red color channel 206, the green color channel 208, the blue color channel 210, and the alpha color 212 channels are each allocated 4-bits. In the RGB565 color format 204, the red color channel 214 is allocated 5-bits, the green color channel 216 is allocated 6-bits, and the blue color channel 218 is allocated 5-bits.

At step 104, once the source color format 204 of the input codeword and the target color format 202 are determined (step 102), a reference color format is accessed. In this example, the reference color format is the RGBA8888 color format 222. In the RGBA8888 color format 222, the red color channel 224, the green color channel 226, the blue color channel 228, and the alpha color channels 230 are each allocated 8-bits. The Most Significant Bit (MSB) of the red channel 224, the MSB of the green channel 226, the MSB of blue channel 228, and the MSB of the alpha channel 230 are designated as reference bit-positions. In particular, the MSB of the red channel 224 is designated as a red channel reference bit, the MSB of the green channel 226 is designated as a green channel reference bit, the MSB of the blue channel 228 is designated as a blue channel reference bit, and the MSB of the alpha channel 230 is designated as an alpha channel reference bit. Using the bit-position indicator 220, it can be seen that the red channel reference bit is located at "bit-position 31," as indicated by 234, the green channel reference bit is located at "bit-position 23," as indicated by 236, the blue channel reference bit is located at "bit-position 15," as indicated by 238, and the alpha channel reference bit is located at "bit-position 7," as indicated by 240.

At step 106, the bits of the input color codeword are shifted (e.g., left shifted or right shifted) so that the MSB (i.e. the color channel reference bit) of each of the color channels 214-218 of the input codeword color format 204 are aligned with each of the corresponding reference bit positions 224-228 of the RGBA8888 color format 222. Since the input codeword color format 204 has no alpha channel, the alpha channel reference bit, as indicated by 230, is discarded. For example, the MSB of the red color channel 214 is aligned with the MSB of the red channel 224 located at "bit-position 31," the MSB of the green color channel 216 is aligned with the MSB of the green channel 226 located at "bit-position 23," and the MSB of the blue color channel 218 is aligned with the MSB of the blue channel 228 located at "bit-position 15."

At step 108, based on the MSB aligning of the input codeword color channels 214-218 and the reference color channels 224-230 (step 106), the number and direction (e.g., left shift or right shift) of the bit-shift for each of color channels 214-218 is determined. In the above example, the red channel 214 is left shifted by 16-bits to align its MSB with the MSB of the red channel 224. The green channel 216 is left shifted by 12-bits to align its MSB with the MSB of the green channel 226, and the blue channel 218 is left shifted by 11-bits to align its MSB with the MSB of the blue channel 228. A summary of these color channel bit-shifts is shown in box 246, where "R2:" denotes the red color channel 214, "G2:" denotes the green color channel 216, "B2:" denotes the blue color channel 218, and "A2:" denotes the alpha color channel (not applicable for RGB565 color format).

At step 110, the bits of the target color format 202 are shifted so that the MSB of each of the color channels 206-212 associated with target color format 202 are aligned with each of the corresponding reference bit positions 224-228 associated with the RGBA8888 reference color format 222. Thus, in this example, the MSB of the red color channel 206 is aligned with the MSB of the red channel 224 located at "bit-position 31," the MSB of the green color channel 208 is aligned with the MSB of the green channel 226 located at "bit-position 23," the MSB of the blue color channel 210 is aligned with the MSB of the blue channel 228 located at "bit-position 15," and the MSB of the alpha color channel 212 is aligned with the MSB of the alpha channel 230 located at "bit-position 7."

At step 112, based on the MSB aligning of color channels 206-212 of the target color format and the reference color channels 224-230 (step 110), the number and direction of the bit-shift for each of color channels 206-212 is determined. In the above example, the red channel 206 is left shifted by 16-bits to align its MSB with the MSB of the red channel 224. The green channel 208 is left shifted by 13-bits to align its MSB with the MSB of the green channel 226, the blue channel 210 is left shifted by 8-bits to align its MSB with the MSB of the blue channel 228, and the alpha channel 212 is left shifted by 4-bits to align its MSB with the MSB of the alpha channel 230. A summary of these color channel bit-shifts is shown in box 248, where "R1:" denotes the red color channel 206, "G1:" denotes the green color channel 208, "B1:" denotes the blue color channel 210, and "A1:" denotes the alpha color channel 212.

At step 114, for each color channel, the color channel bit-shift generated at step 112 is subtracted from the color channel bit-shift generated at step 108 to generate resultant color channel bit-shift values. Using the color channel bit-shifts shown in boxes 246 and 248, the resultant red channel bit-shift value is: R2−R1=16−16='0'; the resultant green channel bit-shift value is: G2−G1=13−12='1'; the resultant blue channel bit-shift value is: B2−B1=11−8='3'; and the resultant alpha channel bit-shift value is: A2−A1=0−4='−4'.

Figure 2A:
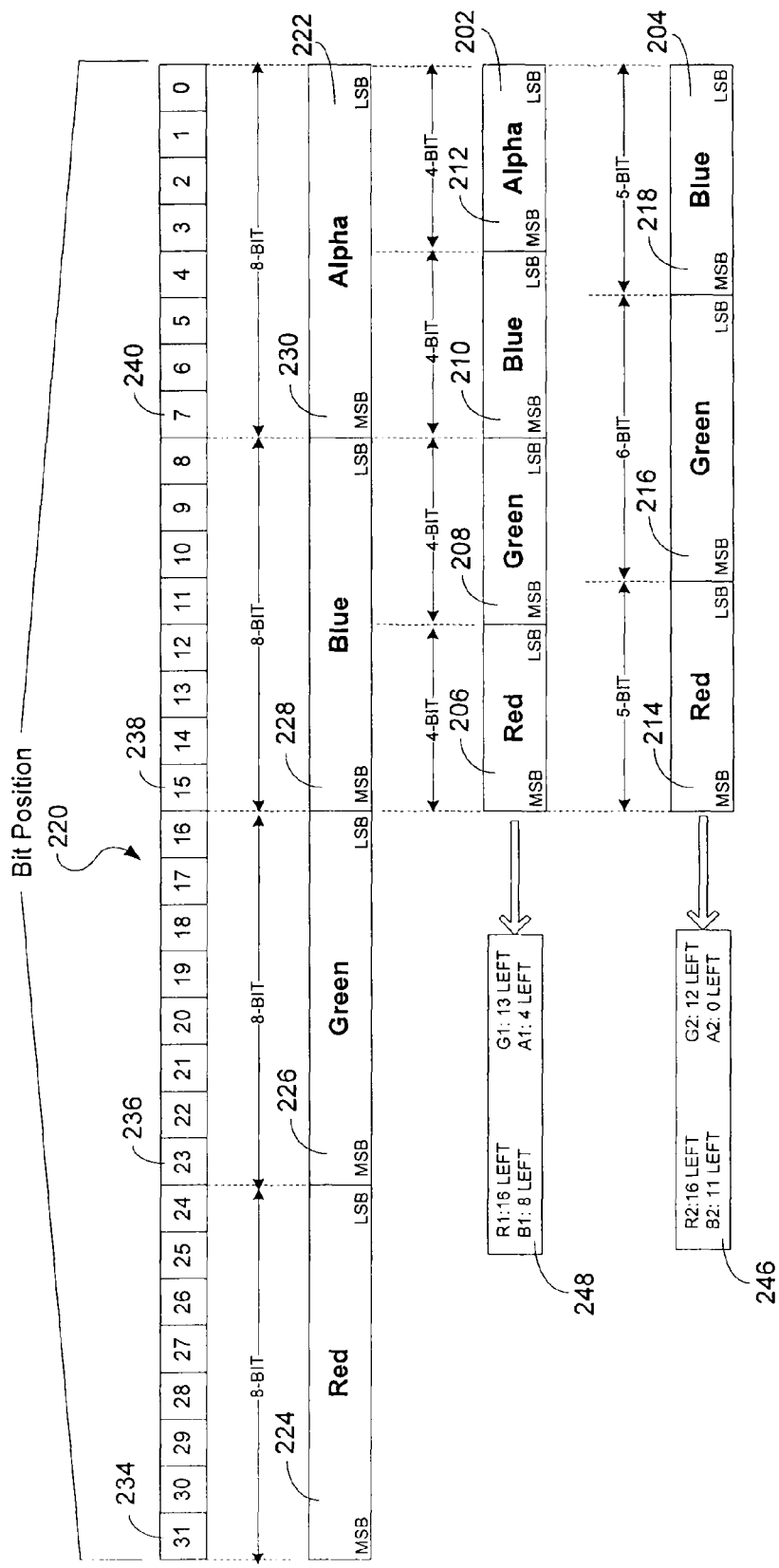
FIGS. 2A and 2B are exemplary bit position diagrams associated with different color formats.
Figure 3A:
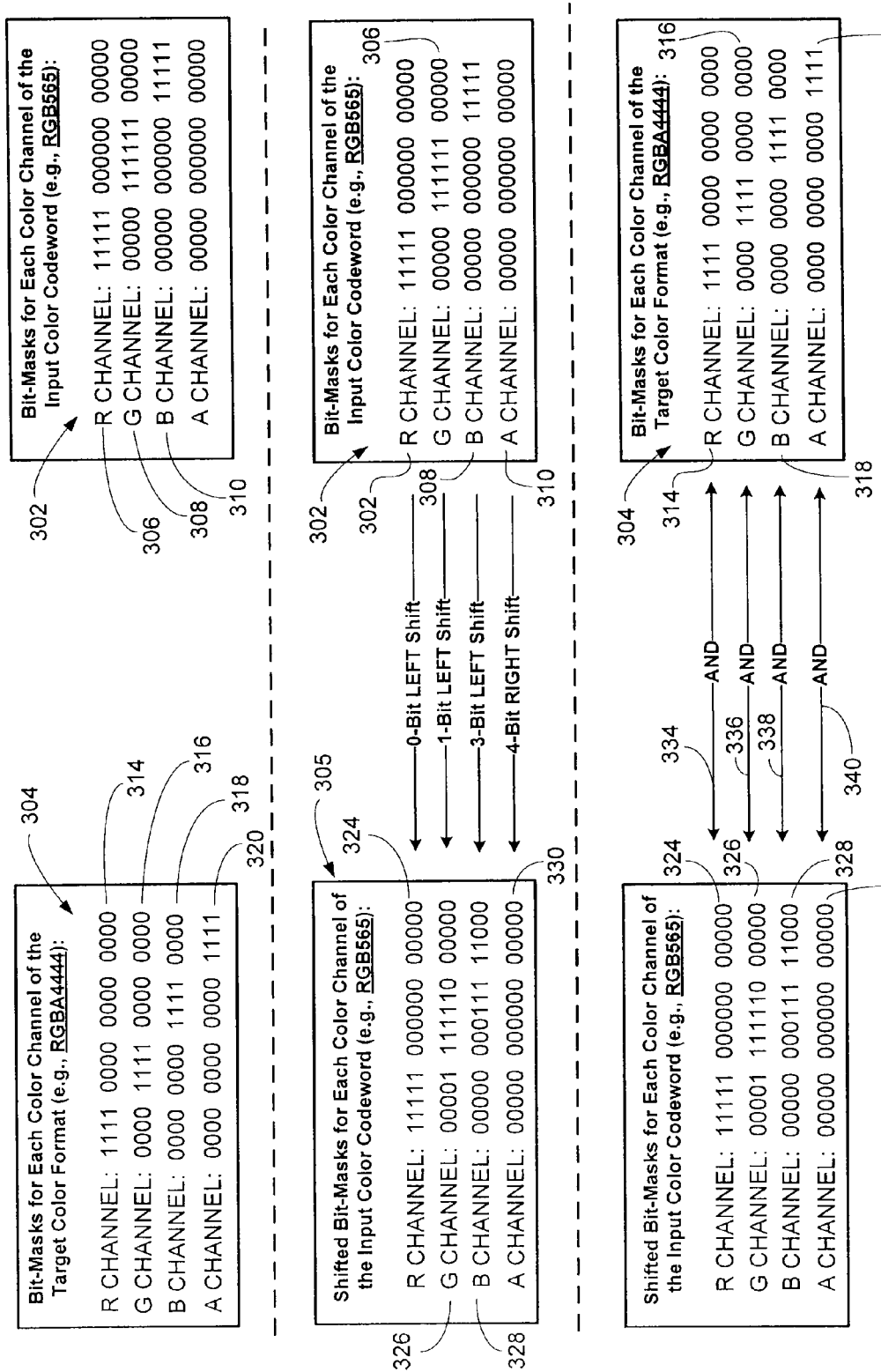
FIGS. 3A and 3B illustrate various bit manipulations that occur during color format conversion.

At step 116, bit-masks 302 associated with masking the different color channels of the input codeword color format 204 (FIG. 2A) are accessed as illustrated in FIG. 3A. The red color channel bit-mask 306 selects the red color channel, and masks the green and blue color channels with zeros using a '11111 000000 00000' bit-mask. The green color channel bit-mask 308 selects the green color channel, and masks the red and blue color channels with zeros using a '00000 111111 00000' bit-mask. The blue color channel bit-mask 310 selects the blue color channel, and masks the red and green color channels with zeros using a '00000 000000 11111' bit mask.

At step 118, bit-masks 304 associated with masking the different color channels of the target color format 202 (FIG. 2A) are accessed as illustrated in FIG. 3A. The red color channel bit-mask 314 selects the red color channel, and masks the green, blue, and alpha color channels with zeros using a '1111 0000 0000 0000' bit-mask. The green color channel bit-mask 316 selects the green color channel, and masks the red, blue, and alpha color channels with zeros using a '0000 1111 0000 0000' bit-mask. The blue color channel bit-mask 318 selects the blue color channel, and masks the red, green, and alpha color channels with zeros using a '0000 0000 1111 0000' bit-mask. The alpha color channel bit-mask 320 selects the alpha color channel, and masks the red, green, and blue color channels with zeros using a '0000 0000 0000 1111' bit-mask.

At step 120, the bit positions associated with bit-masks 302 are shifted according to the resultant color channel bit-shift values (step 114). As illustrated in FIG. 3A, the red color channel bit-mask 306 is left shifted by 0-bits, as indicated at 324; the green color channel bit-mask 308 is left shifted by 1-bit, as indicated at 326; the blue color channel bit-mask 310 is left shifted by 3-bits, as indicated at 328; and the alpha color channel bit-mask 312 is right shifted by 4-bits, as indicated at 330.

At step 122, format conversion bit-masks for each color channel of the input codeword color 204 are generated by applying logic AND operations between bit-masks 304, which are associated with masking the different color channels of the target color format (e.g., RGBA4444), and the bit-shifted bit-masks 305, which are associated with the input codeword color format (RGB565). In particular, as indicated at 334, the AND operation is performed on the bit-shifted red color channel bit-mask 324 and the red color channel bit-mask 314. As indicated at 336, the AND operation is performed on the bit-shifted green color channel bit-mask 326 and the green color channel bit-mask 316. As indicated at 338, the AND operation is performed on the bit-shifted blue color channel bit-mask 328 and the blue color channel bit-mask 318. As indicated at 340, the AND operation is performed on the bit-shifted alpha color channel bit-mask 330 and the alpha color channel bit-mask 320.

Figure 3B:
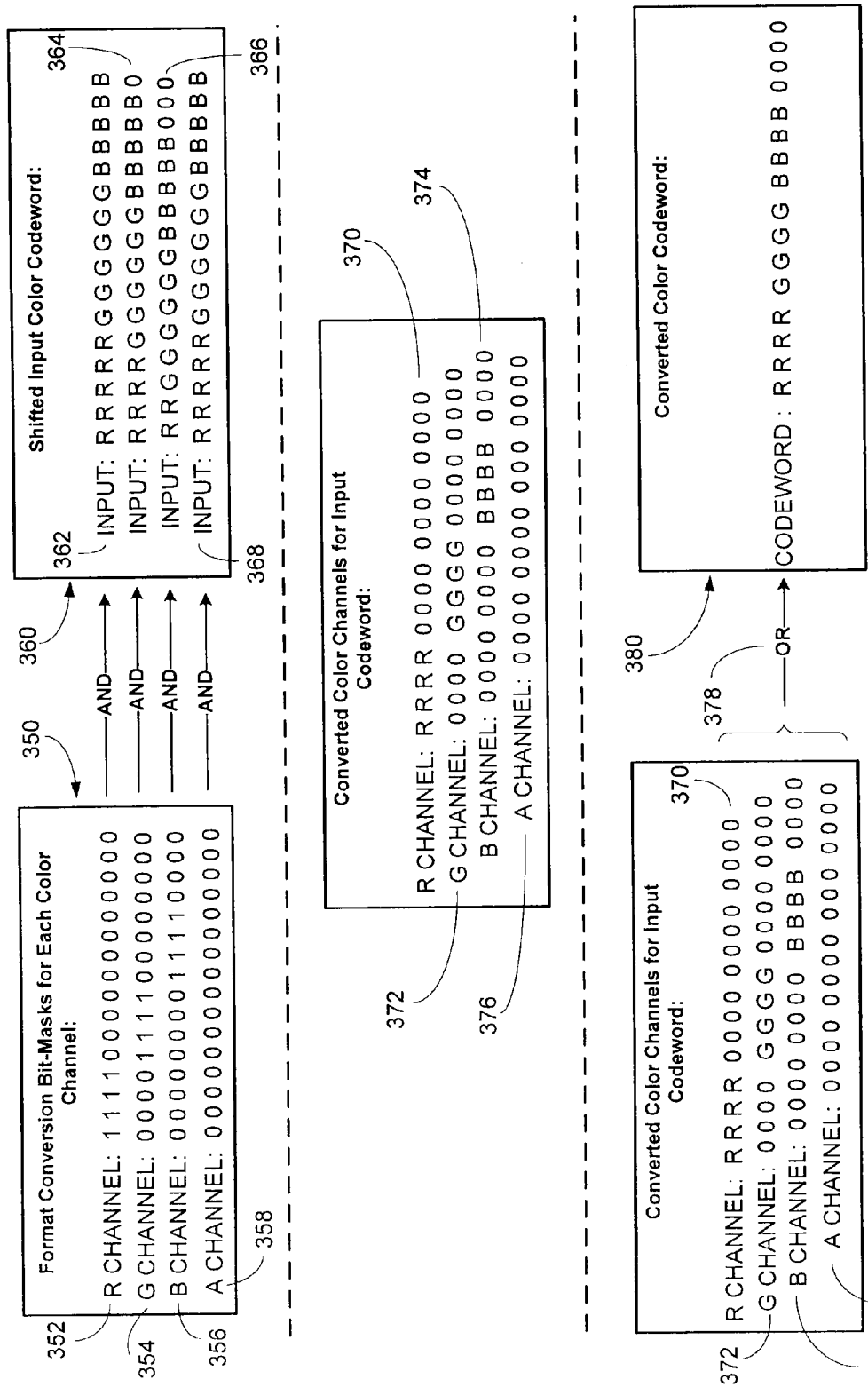

The result of these AND operations produces format conversion bit-masks 350, as illustrated in FIG. 3B. The red channel format conversion mask 352 selects the appropriate bits of the red channel of the bit-shifted input codeword. Likewise, the green channel format conversion mask 354 selects the appropriate bits of the green channel of the bit-shifted input codeword, the blue channel format conversion mask 356 selects the appropriate bits of the blue channel of the bit-shifted input codeword, and the alpha channel format conversion mask 358 selects the appropriate bits of the alpha channel of the bit-shifted input codeword (not applicable to the provided example).

Figure 2B:
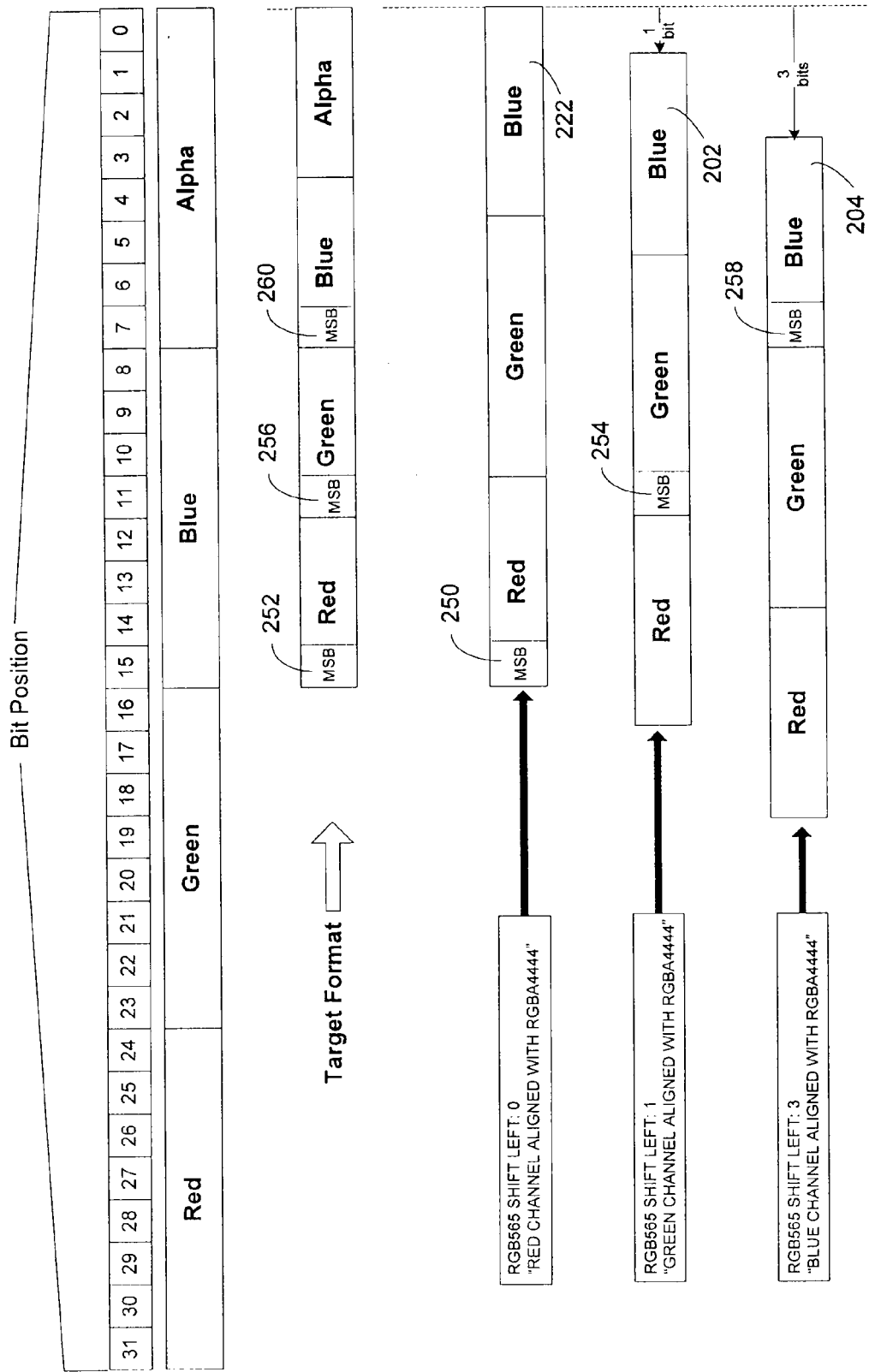

At step 124, the color channels 214-218 (FIG. 2A) of the input codeword (FIG. 2A) are bit-shifted by the resultant color channel bit-shift values (step 114). As shown in FIG. 2B, each color channel is shifted by the corresponding resultant color channel bit-shift value where a positive bit-shift value represents a left shift and a negative bit-shift value represents a right shift. For example, shifting the bit positions of the input codeword red channel by the resultant red channel bit-shift value (i.e., '0') keeps the red channel MSB 250 of the input codeword 204 aligned with the red channel MSB 252 of the target color format 202. Shifting the bit positions of the input codeword green channel by the resultant green channel bit-shift value (i.e., '1') aligns the green channel MSB 254 of the input codeword 204 with the green channel MSB 256 of the target color format 202, and shifting the bit positions of the input codeword blue channel by the resultant blue channel bit-shift value (i.e., '3') aligns the blue channel MSB 258 of the input codeword 204 with the blue channel MSB 260 of the target color format 202. Since the input codeword color format 204 has no alpha color channel, the alpha channel shift value (i.e., '−4') is not used. Referring to FIG. 3B, the result of this bit-shifting is a bit-shifted input color codeword 360, which includes a bit-shifted red channel 362, a bit-shifted green channel 364, and a bit-shifted blue channel 366. An AND operation is then performed on each of the color channels 362-368 of the bit-shifted input color codeword 360 and the format conversion bit masks 352-358 generated at step 122 in order to yield format converted color channels 370-376 (step 124).

At step 126, the format converted color channels 370-376 (step 124) are then combined using a logic OR operation, as indicated by 378, in order to form converted color codeword 380. In place of an OR operation, the format converted color channels 370-376 may, for example, be concatenated in a red, green, blue, and alpha sequence, whereby the zero bits in each of the color channels are discarded. The method steps described above may be implemented using a multitude of architectures. The exemplary embodiments illustrated in FIGS. 4-6 and described below are examples of such implementations.

Figure 4:
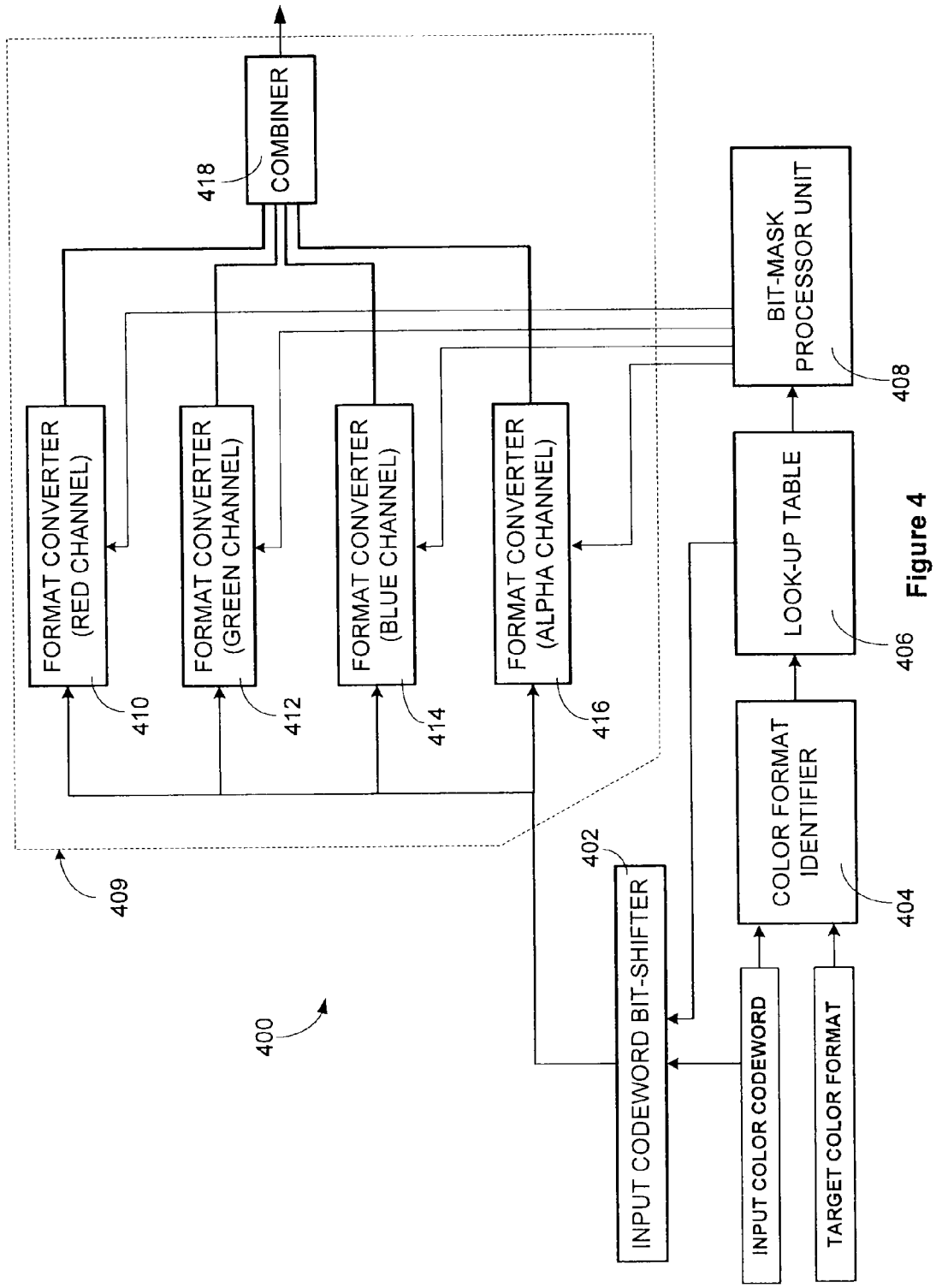
FIG. 4 is a block diagram of an exemplary color format conversion system.
Figure 5A:
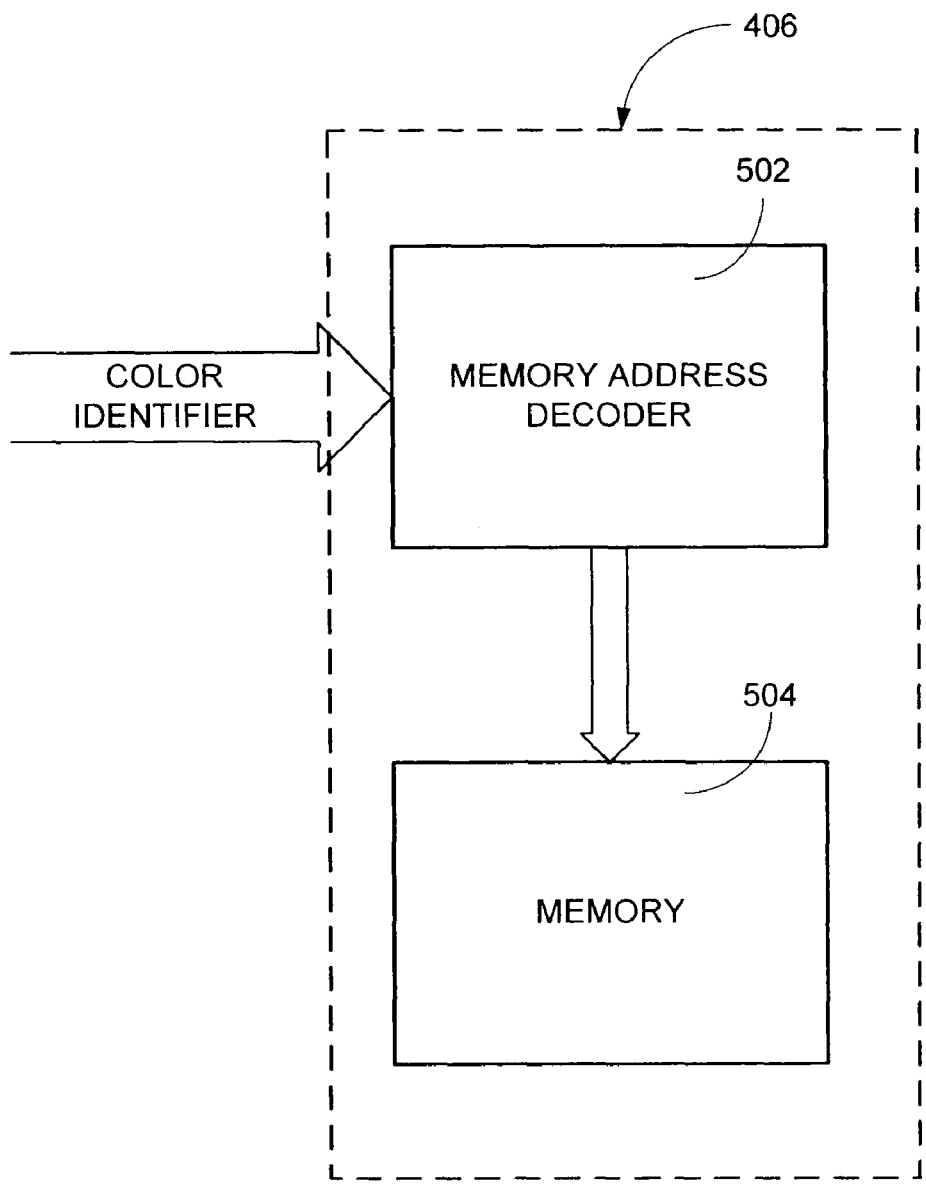
FIGS. 5A-5C illustrate components of the color format conversion system of FIG. 4.
Figure 5B:
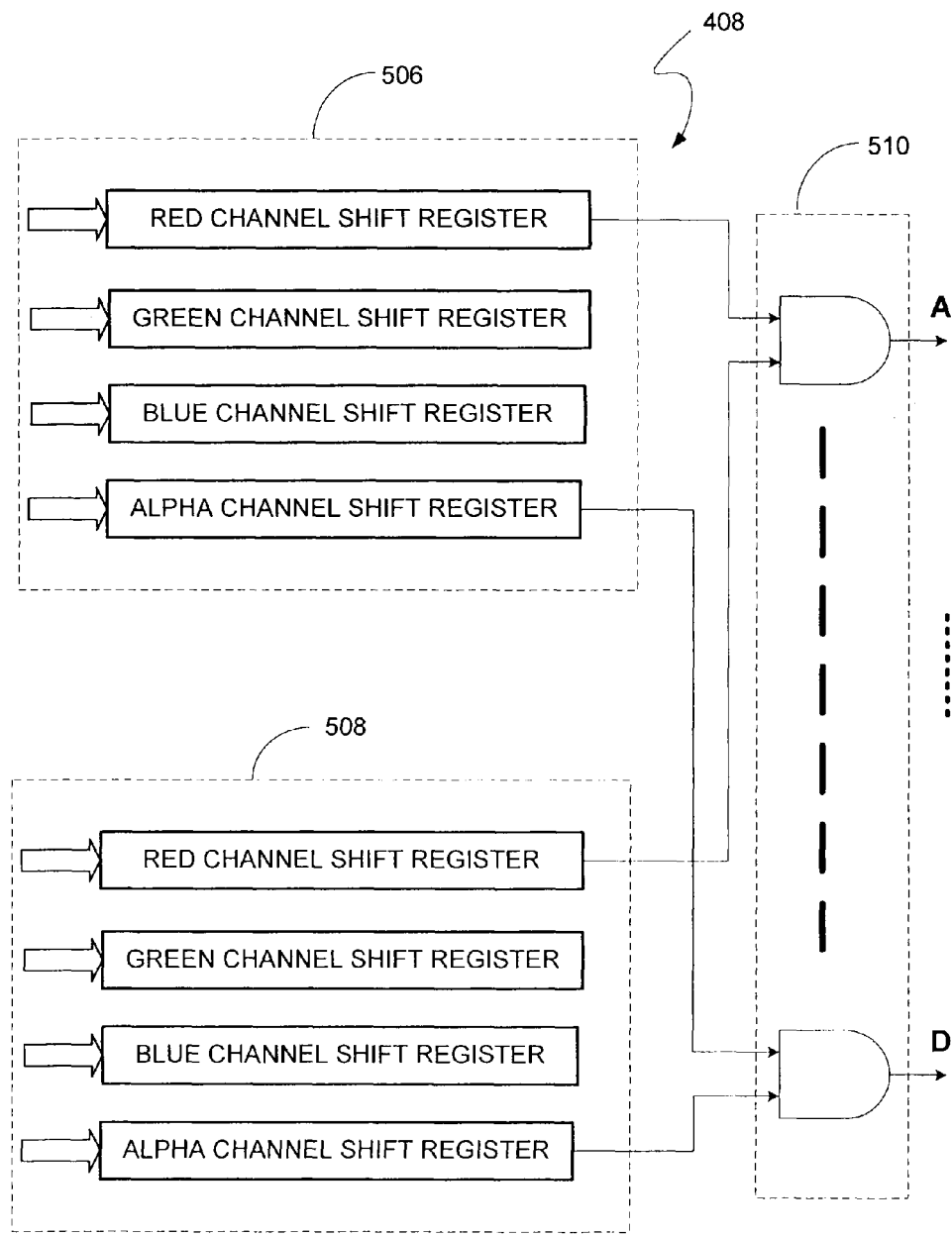
Figure 5C:
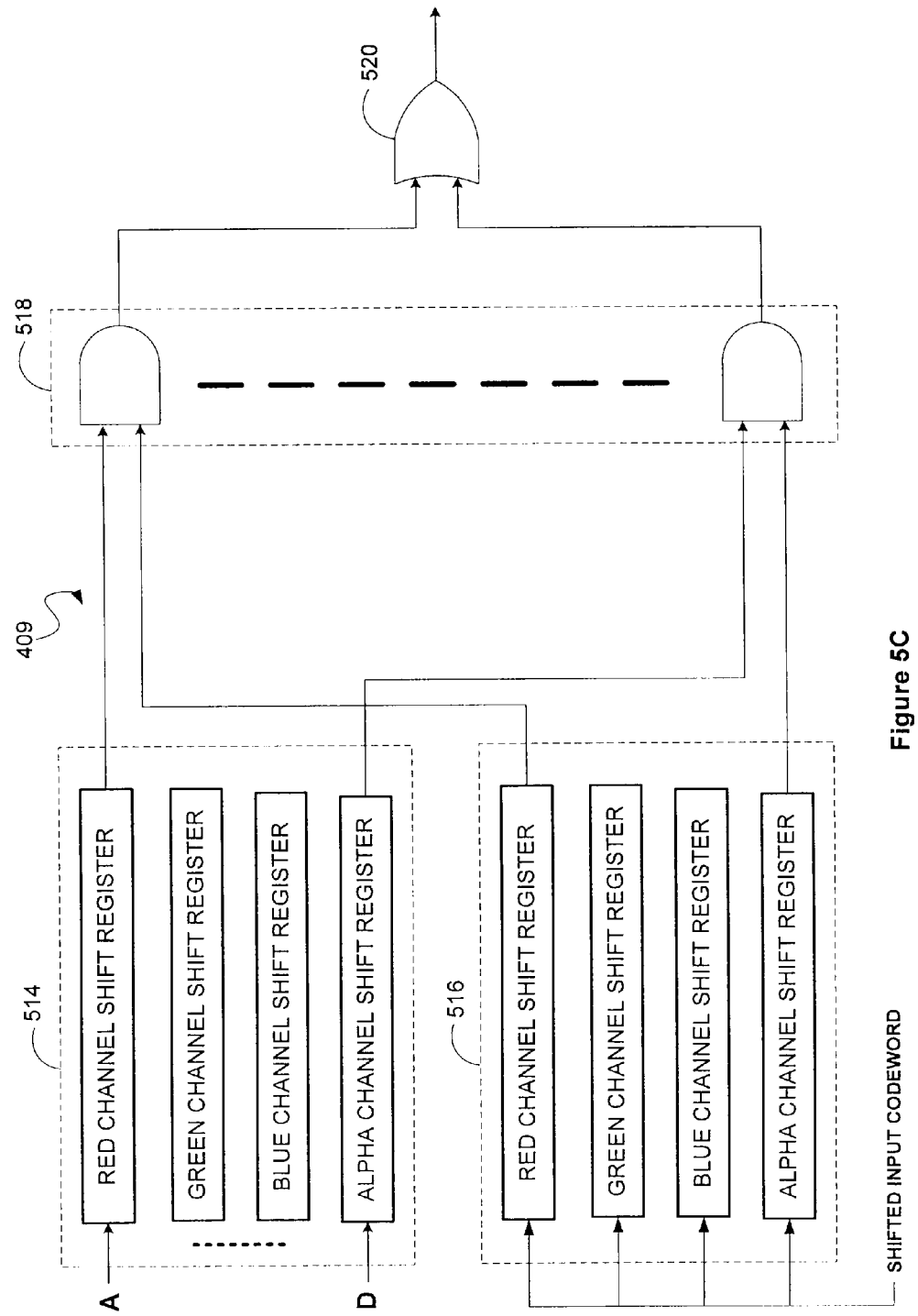

Turning now to FIG. 4, a block diagram of an exemplary color format conversion system 400 for carrying out the steps of FIG. 1 is shown. The system comprises an input codeword bit shifter 402, a color format identifier 404, a look-up table 406, a bit-mask processor unit 408, format converters 410-416, and a combiner unit 418. The functionality of the format conversion system 400 is described with the aid of the operational flow chart of FIG. 1. Components of system 400 are shown in FIGS. 5A-5C.

Both an input color codeword 401 (e.g., formatted data-bits) and a target color format 403 are input to the color format identifier 404. The color format identifier 404 analyzes (step 102) one or more of the data-bits that are included in each of the input color codeword 401 and target color format 403 in order determine their respective color formats (e.g., RGB565, RGBA4444, or RGBA8888). Once the color format identifier 404 determines the respective color formats by data-bit analysis, it generates an identifier code that is received by look-up table 406. Alternatively, the color format identifier 404 receives a known color format associated with the input color codeword 401 and a known target color format 403, where based on these color formats, the identifier code is generated. Using combinational logic, the format identifier 404 may generate different identifier codes based on decoding the different color formats associated with each input codeword and designated target color format.

Look-up table 406 in this example includes a memory address decoder 502 (FIG. 5A) and a memory device 504 (FIG. 5A) such as ROM, whereby the memory address decoder 502 is adapted to receive the identifier code and generate a memory location address for accessing a specific location within the memory device 504. Based on the identifier code, the memory device 504 accesses the color value bit-shift values (step 114), the bit-masks corresponding to the color channels of the target color format (step 116), and the bit-masks corresponding to the color channels of the input codeword color format (step 118). Look-up table 406 includes a pre-programmed list of color value bit-shift values, bit-masks corresponding to the color channels of the target color format, and bit-masks corresponding to the color channels of the input codeword color format for all of the different combinations of input and target color formats. This pre-programmed list is generated using steps 104-112 prior to being loaded into look-up table 406.

The bit-mask processor unit 408 may, for example, include a first plurality of shift registers 506 (FIG. 5B) adapted to receive the bit-masks corresponding to the color channels of the target color format, a second plurality of shift registers 508 (FIG. 5B) adapted to receive the bit-masks corresponding to the color channels of the input codeword color format, and AND gate logic devices 510 (FIG. 5B) coupled to both the first and the second plurality of shift registers. The first plurality of shift registers 506 are adapted to shift the bit-masks corresponding to the color channels of the input codeword by the color value bit-shift values (step 120). The AND gate logic devices 510 then perform AND logic operations between the respective color channels of the shifted bit-masks corresponding to the input codeword and the bit-masks corresponding to the target color format (step 122). Format conversion bit-masks are generated as a result of the AND operations between bit-masks corresponding to the color channels of the input codeword and the bit-masks corresponding to the color channels of the target color format (step 122).

The format converters 410-416 in this example, each include a first shift register 514 (FIG. 5C) for receiving one of the format conversion bit-masks 350 (FIG. 3) associated with a color channel (e.g., red, green, blue, or alpha), a second shift register 516 (FIG. 5C) for receiving the bit-shifted color channels of the input color codeword from the input codeword bit-shifter 402, and AND logic gates 518 (FIG. 5C) coupled to both the first and second shift registers 514, 516 for performing an AND logic operation between one of the format conversion bit-masks 350 (FIG. 3) associated with a color channel (e.g., red channel format conversion mask) and the bit-shifted input codeword (step 124). The resultant output from each of the AND gates 518 associated with format converters 410-416 generates a format converted color channel 370-376 (step 124). The combiner 418, in this example includes an OR logic gate 520 that combines the format converted color channels 370-376 in order to yield the converted color codeword (step 126)

The input codeword bit-shifter 402 may be coupled to the format converters 410-416, whereby converters 410-416 and combiner 418 form a format conversion unit 409. Alternatively, the input codeword bit-shifter 402 may be coupled directly to each of the AND gates within each of the format converters 410-416 without the need to include the second shift registers. In such an embodiment, the input codeword bit-shifter 402, format converters 410-416, and the combiner 418 form a format conversion unit. The input codeword bit-shifter 402 may include a plurality of shift registers (not shown) that are each adapted to receive one of the color channels 214-218 (FIG. 2A) of input codeword 204 (FIG. 2A).

Figure 6:
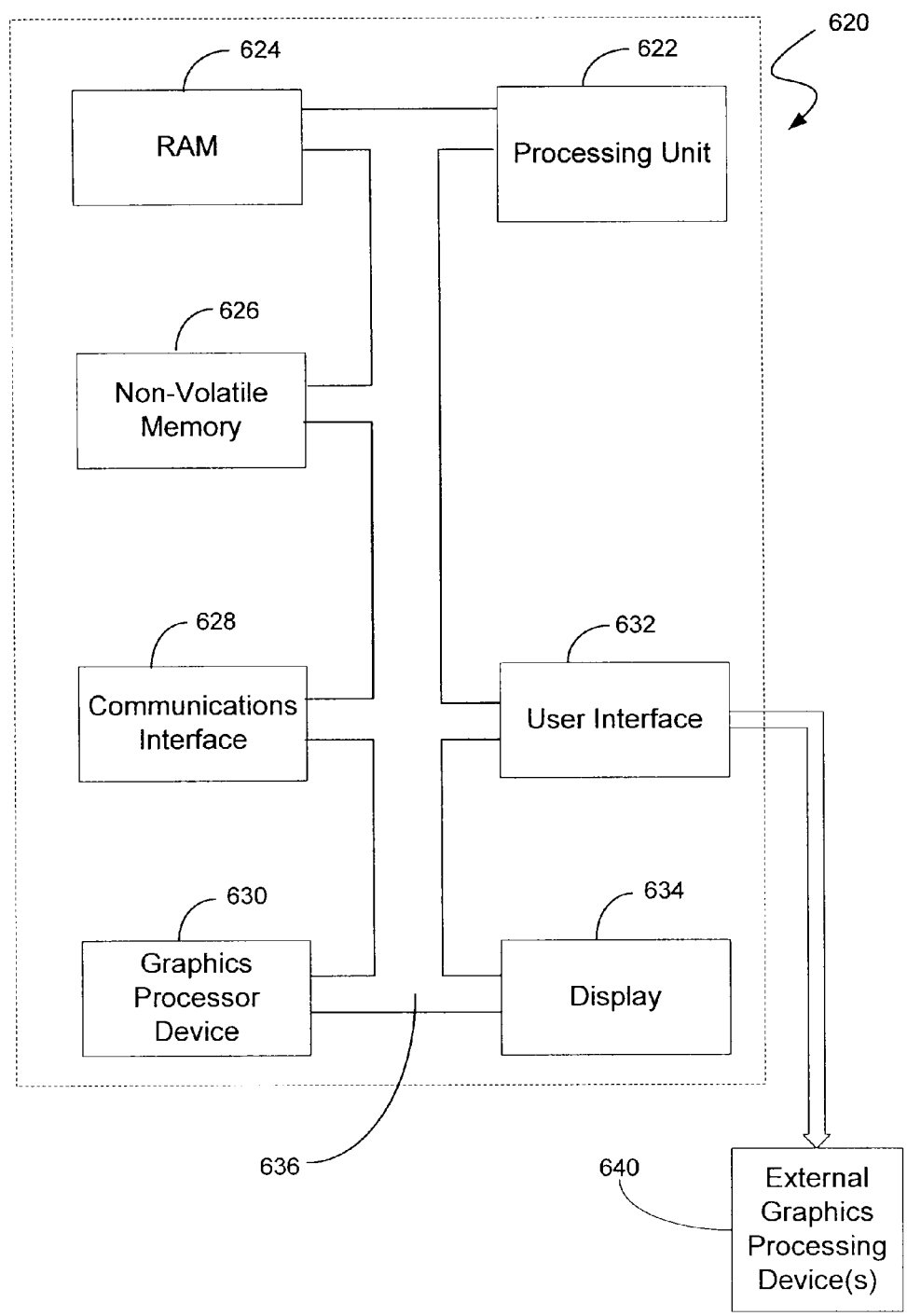
FIG. 6 is a block diagram of another exemplary color format conversion system.

Turning now to FIG. 6, another exemplary color format conversion system 620 for providing color format conversion in computer graphics is shown. In this embodiment, the system 620 converts color codewords from one color format to another designated color format using the conversion process described and illustrated with respect to the operational flow diagram 100 of FIG. 1. As illustrated, the system 620 comprises a processing unit 622, a random access memory ("RAM") 624, a non-volatile memory 626, a communications interface 628, a graphics processing device 630, a user interface 632, and a display 634, all in communication over a local bus 636.

The processing unit 622 retrieves a color format conversion software application program from the non-volatile memory 626 into the RAM 624 for execution. The color format conversion software application program incorporates executable code that is operable to perform the operational steps of FIG. 1. Upon execution of the color format conversion software application program, input codewords that are received either over the communication interface 628 or from the user interface 632 are processed in order to determine the received codeword's color format and the target color format to which the input codeword is to be converted. Via user interface 632, a user may elect to determine the supported color formats associated with the received input codewords and the target color formats available for designation. Following processing at the processing unit 622, user interface 632 may also facilitate the transfer of color format converted input codewords to a local memory device such as non-volatile memory 626, a remote storage device or facility (not shown) by means of communications interface 628, or to one or more external graphics processing devices 640 such as a graphics accelerator card.

In some embodiments, the graphics processing device 630 may be integrated into processing unit 622. In other embodiments, the graphics processing device 630 executes the color format conversion software application program, whereby the processing unit 622 facilitates the loading of the color format conversion software from the non-volatile memory 626 into resident memory (not shown) on the graphics processing device 630.

The color format conversion software application may include program modules including routines, programs, object components, data structures etc. and be embodied as computer readable program code stored on a computer readable medium. The computer readable medium is any data storage device that can store data, which can thereafter be read by a computer system. Examples of computer readable medium include for example read-only memory, random-access memory, CD-ROMs, magnetic tape and optical data storage devices. The computer readable program code can also be distributed over a network including coupled computer systems so that the computer readable program code is stored and executed in a distributed fashion. Furthermore, in addition to a software application executed on a personal computer, a myriad of dedicated hardware and/or firmware solutions may be used to implement the proposed color format conversion method described below.

Although embodiments have been described, those of skill in the art will appreciate that variations and modifications may be made without departing from the spirit and scope thereof as defined by the appended claims.

What is claimed is:

1. A method of converting an input color codeword from a first color format to a second color format, the method comprising:
   using a computer processing unit to perform the steps of:
   providing a reference format having reference bit positions;
   comparing first bit positions associated with the first color format to the reference bit positions;
   comparing second bit positions associated with the second color format to the reference bit positions;
   determining relative bit position shifts based on the compared first bit positions and the compared second bit positions;
   generating format conversion bit masks based on the first and second color formats and the determined relative bit position shifts; and
   converting the input color codeword to the second color format based on the format conversion bit masks and the relative bit position shifts.

2. The method according to claim 1, wherein the input color codeword, the second color format and the reference format each comprise a plurality of channels and wherein said comparing, determining, generating and converting is performed for each channel.

3. The method of claim 2 wherein the first, second and reference bit positions are most significant bits of the channels.

4. The method according to claim 2, wherein the channels of said input color codeword, second color format and reference format at least comprise a red channel, a green channel, and a blue channel.

5. The method according to claim 3, wherein the channels of at least one of the input color codeword, second color format and reference format further comprise an alpha channel.

6. The method according to claim 5, wherein accessing the reference format is an RGBA8888 color format.

7. The method according to claim 1, wherein the first color format comprises one of an RGBA4444 color format, an RGB565 format, and an RGBA8888 color format.

8. The method according to claim 1, wherein the second color format comprises one of an RGBA4444 color format, an RGB565 format, and an RGBA8888 color format.

9. The method according to claim 1, wherein the comparing of the first bit positions to the reference bit positions comprises determining bit position differences between the first bit positions and the reference bit positions.

10. The method according to claim 1, wherein the comparing of the second bit positions to the reference bit positions comprises determining bit position differences between the second bit positions and the reference bit positions.

11. The method according to claim 1, wherein the determined relative bit position shifts comprise calculating a difference between the compared first bit positions and the compared second bit positions.

12. The method according to claim 1, wherein the generating of the format conversion bit masks comprises:
   providing a first plurality of bit-masks associated with the first color format;
   providing a second plurality of bit-masks associated with the second color format;
   bit-shifting the first plurality of bit-masks based on the determined relative bit position shifts; and
   performing a logic AND operation on the bit-shifted first plurality of bit-masks and the second plurality of bit-masks.

13. The method according to claim 2, wherein said converting comprises performing a logic OR operation on the converted color channels.

14. A system for converting an input color codeword from a first color format to a second color format, the system comprising:
   means for comparing first bit positions associated with the first color format to reference bit positions associated with a reference format;
   means for comparing second bit positions associated with the second color format to the reference bit positions;
   means for determining relative bit position shifts based on the compared first bit positions and the compared second bit positions;
   means for generating format conversion bit masks based on the first and second color format and the determined relative bit position shifts; and
   means for converting the input color codeword to the second color format based on the format conversion bit masks and the relative bit position shifts.

15. A non-transitory computer-readable medium embodying machine-readable code for converting an input color codeword from a first color format to a second color format, the machine-readable code comprising:
   machine-readable code for comparing first bit positions associated with the first color format to reference bit positions associated with a reference format;
   machine-readable code for comparing second bit positions associated with the second color format to the reference bit positions;
   machine-readable code for determining relative bit position shifts based on the compared first bit positions and the compared second bit positions;
   machine-readable code for generating format conversion bit masks based on the first and second color format and the determined relative bit position shifts; and
   machine-readable code for converting the input color codeword to the second color format based on the format conversion bit masks and the relative bit position shifts.

16. A system for converting an input color codeword from a first color format to a second color format, the system comprising:
   a lookup table adapted to receive an identifier, the identifier identifying first bit-masks corresponding to the first color format, second bit-masks corresponding to the second color format, and bit-shift values associated with the first and the second color format;
   a bit-mask processor unit operatively coupled to the lookup table, the bit-mask processor unit adapted to generate format conversion bit-masks based on the identified first and second bit-masks and the bit-shift values; and
   a codeword format conversion unit operatively coupled to the bit-mask processor unit and the lookup table, and adapted to convert the input color codeword to a different second color format based on the format conversion bit-masks and the bit-shift values.

17. The system according to claim 16, further comprising a color format identifier adapted to receive the first color format and the second color format, the color format identifier operative to generate the identifier based on the first and the second color format.

18. The system according to claim 16, wherein the lookup table comprises:
- a memory address decoder adapted to receive the identifier and generate a memory address location; and
- a memory device adapted to receive the memory address location and retrieve the first bit-masks, the second bit-masks, and the bit-shift values.

19. The system according to claim 16, wherein the bit-mask processor unit comprises:
- a first plurality of shift registers adapted to receive the fiist bit-masks;
- a second plurality of shift registers adapted to receive the second bit-masks, wherein the second plurality of shift registers shift the second bit-masks according to the bit-shift values; and
- a logic device operatively coupled to the first and the second plurality of shift registers, wherein the logic device is adapted to perform an AND logic operation between the shifted second bit-masks and the first bit-masks to generate the format conversion bit-masks.

20. The system according to claim 16, wherein the codeword format conversion unit comprises:
- a first plurality of shift registers each adapted to receive one of a plurality of color channel bit-masks associated with the generated format conversion bit-masks;
- a second plurality of shift registers adapted to receive a plurality of color channels associated with the input color codeword, wherein the plurality of color channels is bit-shifted according to the bit-shift values;
- a plurality of logic devices each operatively coupled to each of the first and the second plurality of shift registers, wherein each of the plurality of logic devices is adapted to perform an AND logic operation on one of the bit-shifted color channels and a corresponding one of the plurality of color channel bit-masks; and
- a logic device operatively coupled to the plurality of logic devices, wherein the logic device is adapted to perform a logic OR operation on a result of each AND logic operation on the one of the bit-shifted color channels and the corresponding one of the plurality of color channel bit-masks.

21. The system according to claim 20, wherein the plurality of color channel bit-masks comprise a red channel bit-mask, a green channel bit-mask, a blue channel bit-mask, and an alpha channel bit-mask.

22. The system according to claim 16, wherein the first color format comprises one of an RGBA4444 color format, an RGB565 format, and an RGBA8888 color format.

23. The system according to claim 16, wherein the second color format comprises one of an RGBA4444 color format, an RGB565 format, and an RGBA8888 color format.

24. The system according to claim 16, further comprising an input codeword bit-shifter adapted to receive the input color codeword and shift a plurality of color channels associated with the input color codeword by the bit-shift values.

* * * * *